United States Patent [19]

Buysch et al.

[11] Patent Number: 4,654,387

[45] Date of Patent: Mar. 31, 1987

[54] ANTIAGERS AND POLYMERS CONTAINING THEM

[75] Inventors: Hans-Josef Buysch, Krefeld; Zsolt Szentivanyi, Leverkusen; Josef Witte, Cologne, all of Fed. Rep. of Germany

[73] Assignee: Bayer Aktiengesellschaft, Leverkusen, Fed. Rep. of Germany

[21] Appl. No.: 763,393

[22] Filed: Aug. 7, 1985

[30] Foreign Application Priority Data

Aug. 18, 1984 [DE] Fed. Rep. of Germany ....... 3430512

[51] Int. Cl.[4] ............. C07D 103/133; C07D 103/153; C08K 5/20; C08F 279/02; C08F 220/60
[52] U.S. Cl. .................................. 524/217; 524/169; 524/198; 524/199; 524/238; 524/255; 524/925; 524/928; 525/296; 526/304; 526/307; 560/43; 560/48; 562/457; 564/92; 564/95; 564/207; 564/434
[58] Field of Search ............... 524/169, 198, 217, 199, 524/238, 255, 925, 928; 560/27, 43, 48; 525/296; 562/457; 564/92, 95, 207, 434; 548/546; 526/304, 307

[56] References Cited

U.S. PATENT DOCUMENTS

| | | | |
|---|---|---|---|
| 2,266,603 | 12/1941 | Howland | 524/217 |
| 3,452,056 | 6/1969 | Sundholm | 524/258 |
| 3,668,254 | 6/1972 | D'Amico et al. | 564/434 |
| 3,689,513 | 9/1972 | Cain et al. | 564/434 |
| 4,298,522 | 11/1981 | Tamura et al. | 524/255 |
| 4,354,007 | 12/1982 | Scott | 525/370 |
| 4,376,846 | 3/1983 | Kotani et al. | 525/218 |

FOREIGN PATENT DOCUMENTS 0041915 12/1981 European Pat. Off. .

Primary Examiner—Veronica P. Hoke
Attorney, Agent, or Firm—Connolly & Hutz

[57] ABSTRACT

Compounds corresponding to the following general formula:

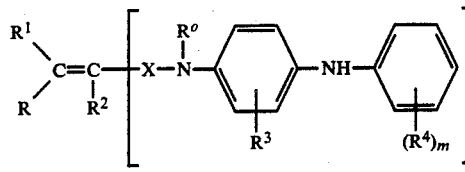

wherein
$R^0$ represents H or, together with $R^1$, represents —CO— when X represents —CO— or, together with $R^2$, represents —CO— when X represents —CH$_2$—CO,
a residue of R, $R^1$ and $R^2$, H, $C_1$-$C_4$ alkyl, aryl, COOR$^5$ or, when $R^0$ represents H and X represents —CO—,

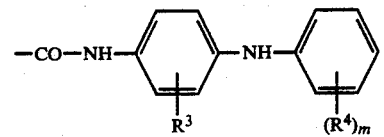

and the other residues R, $R^1$ and $R^2$ represent H;
$R^3$ represents H or CH$_3$;
$R^4$ represents $C_7$-$C_{20}$ aralkyl;
$R^5$ represents H, $C_1$-$C_4$ alkyl or $C_6$-$C_{12}$ aryl;
X represents a residue —(CH$_2$)$_n$CO—, —(CH$_2$)$_n$SO$_2$, —CH$_2$—, —CH$_2$O—CO—

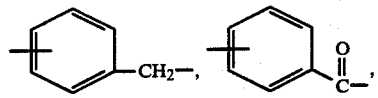 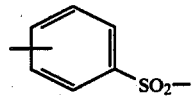

m represents 1 or 2; and
n represents 0 or 1;

are suitable for use as incorporable antiagers for polymers, particularly nitrile rubber.

6 Claims, No Drawings

ANTIAGERS AND POLYMERS CONTAINING THEM

This invention relates to compounds corresponding to the following general formula:

$$\begin{bmatrix} R^1 \\ \diagdown \\ C=C \\ \diagup \quad \diagdown \\ R \quad R^2 \end{bmatrix} \begin{matrix} R^o \\ | \\ X-N \end{matrix} \underset{R^3}{\underset{|}{\bigcirc}} -NH- \underset{(R^4)_m}{\underset{|}{\bigcirc}} \quad (I)$$

wherein
R⁰ represents H or, together with R¹, represents —CO— when X represents —CO— or, together with R², represents —CO— when X represents —CH₂—CO—,
a residue of R, R¹ and R², H, C₁-C₄ alkyl, aryl, COOR⁵ or, when R⁰ represents H and X represents —CO—, —CH₂— or —CH₂—O—CO—, $$-X-NH-\underset{R^3}{\underset{|}{\bigcirc}}-NH-\underset{(R^4)_m}{\underset{|}{\bigcirc}}$$

and the other residues R, R¹ and R² represent H, X represents a residue $$-(CH_2)_n-\overset{O}{\overset{\|}{C}}-, \quad -(CH_2)_nSO_2-, \quad -CH_2-, \quad -CH_2O\overset{O}{\overset{\|}{C}}-$$

$$\underset{}{\bigcirc}-CH_2-, \quad \underset{}{\bigcirc}-\overset{O}{\overset{\|}{C}}-,$$

$$\underset{}{\bigcirc}-SO_2-$$

n represents 0 or 1;
R³ represents H or CH₃;
R⁴ represents C₇-C₂₀ aralkyl;
R⁵ represents H, C₁-C₄ alkyl or C₆-C₁₂ aryl; and
m represents 1 or 2;
and also polymers containing these compounds.

Polymers are rapidly changed by the action of light, air and heat and lose the favourable service properties thereof as a result of degradation and cross-linking processes. Because of this, antiagers are added to the polymers, considerably prolonging the useful life thereof. However, an addition of antiagers is often not sufficient when utility articles of polymers of the type in question come into contact with media which are capable of extracting the antiagers and, hence, seriously impair or even neutralize the protective function thereof. It is also known that antiagers migrate and exude from the polymers.

It has been proposed in such cases to bind the antiagers to the polymer or to use polymeric antiagers.

Thus, according to DE-OS 20 25 336, amides corresponding to the following general formula:

$$\underset{R^8}{\overset{R^6}{\diagdown}}R^7-R^9-NH-\underset{R^7}{\underset{|}{\bigcirc}}\overset{R^6}{\underset{|}{-}}-NHCO-\underset{R^{10}}{\overset{|}{C}}=CH-R^{11} \quad (II)$$

wherein
R⁹ represents aryl;
R⁶ and R⁷ represent H or C₁-C₄ alkyl;
R⁸ represents H, C₁-C₄ alkyl, C₁-C₄ alkoxy or C₁-C₁₃ alkylamino;
R¹⁰ and R¹¹ represent a C₁ or C₂ alkyl or C₆-C₁₀ aryl residue, a carboxyl or carboxyalkyl residue;
preferably acylamides of 4-aminodiphenylamine, are polymerized with butadiene. Polymers of this type are said to show greater resistance after extractive treatments, such as dry cleaning, then polymers which have been stabilized solely by the addition of antiagers.

According to U.S. Pat. No. 3,867,334, the amides corresponding to formula (II) may also be used to stabilize carbon black-reinforced, sulphur-vulcanized rubber providing they are added under certain conditions.

DE-OS 25 09 654 describes the peroxidic grafting of N-4-(phenylaminophenyl)-acrylamide:

$$CH_2=CH-CONH-\underset{}{\bigcirc}-NH-\underset{}{\bigcirc}$$

onto natural rubber.

DE-OS 30 22 952 relates to compounds corresponding to the following general formula:

$$CH_2=\underset{R^{12}}{\overset{|}{C}}-A-\underset{R^{13}}{\underset{|}{\bigcirc}}-NH-\underset{R^{14}}{\underset{|}{\bigcirc}} \quad (III)$$

wherein
R¹² represents H or CH₃;
R¹³ and R¹⁴ represent H, Cl, Br or C₁-C₁₂ alkyl; and
A represents $$\underset{}{\bigcirc}-CH_2NH-, \quad \underset{}{\bigcirc}-SO_2NH-,$$

$$\underset{}{\bigcirc}-CH_2-O-\underset{}{\bigcirc}-SO_2NH- \text{ or } CH_2-SO_2-NH-;$$

and rubber-like polymers which contain these compounds in chemically-bound form and which afford a certian, improved protection against ageing under extractive conditions.

Also DE-OS 31 13 351 recommends nitrile rubbers having a particular composition, including a content of from 5 to 60%, by weight, of a vinyl chloride polymer, for heat-resistant and oil-resistant mouldings which contain, as stabilizers, compounds corresponding to formula (II) above or amides corresponding to formula (IV) below:

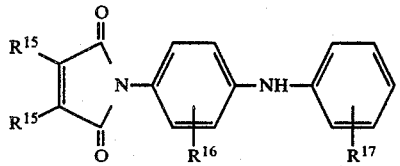

wherein
$R^{15}$ represents H or $C_1$-$C_4$ alkyl;
$R^{16}$ and $R^{17}$ represent H, Cl, Br or $C_1$-$C_{12}$ alkyl.

The requirements which the resistance of rubber components, for example seals and hoses, has to satisfy in the operation of internal combustion engines are becoming increasingly more stringent on account of the compact construction involved and the elevated working temperatures. In this connection, it has been found that, although the antiageing effect of the known compounds reaches a useful level, it is still greatly in need of improvement if damage and leaks attributable to oxidation are to be avoided. In the event of normal ageing under non-extractive conditions, it does not come anywhere near the effect of the non-fixable antiagers normally used, such as distyryl diphenylamine.

An object of the present invention is to provide new antiagers which may be chemically fixed to polymers and which afford improved protection against ageing under extractive conditions or in the presence of oxidized oils or fuels and polymers containing these antiagers.

It has now surprisingly been found that the compounds of formula (I) mentioned initially afford the required improved protection against ageing. Preferred compounds (I) are those wherein
$R^0$ represents H or, together with $R^1$, represents —CO— when X represents —CO—;
R represents H or $CH_3$;
$R^1$ represents H, $CH_3$, $COOR^5$,

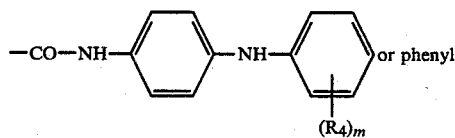

$R^2$ represents H or $CH_3$;
X represents $CO$, $CH_2$, $SO_2$, $CH_2SO_2$ or

$R^3$ represents H;
$R^4$ represents $C_7$-$C_{18}$ aralkyl;
$R^5$ represents H or $C_1$-$C_4$ alkyl; and
m represents 1 or 2.

Particularly preferred compounds (I) are those wherein
$R^0$, R and $R^3$ represent H;
$R^1$ represents H, phenyl or $COOR^5$;
$R^2$ represents H or $CH_3$;
X represents CO or $CH_2$;
$R^4$ represents $C_7$-$C_{13}$ aralkyl;
$R^5$ represents H or $C_1$-$C_4$ alkyl; and
m represents 1 or 2.

The compounds corresponding to general formula (I) according to the present invention are produced by reacting 4-aminodiphenylamine derivatives corresponding to the following general formula:

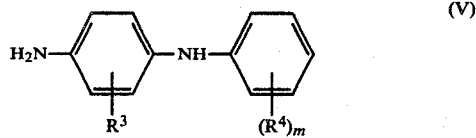

wherein
$R^3$, $R^4$ and m are as defined above;
with compounds corresponding to the following general formula:

wherein
R, $R^1$, $R^2$ and X are as defined above; and
Y represents Cl or, together with $R^1$, represents —CO—O when X represents —CO or, together with $R^2$, represents —CO— when X represents —$CH_2$—CO or represents $OR^5$ wherein $R^5$ is as defined above.

The aralkyl group $R^4$ is preferably in the p-position, although the products always contain a certain percentage of o-compound.

The production of the compounds (I) according to the present invention by reacting the 4-aminodiphenylamine derivatives (V) with the unsaturated compounds (VI) may be carried out by various known methods, namely:

(1) by acylation of (V) with the reactive acid chlorides (for example (VI) with X=CO or $SO_2$ and Y=Cl) in the presence of bases, such as sodium hydroxide, using the two-phase system according to Schotten-Baumann or in the presence of tertiary amines or alkali metal carbonates and catalytic quantities of tertiary amines using the method described in U.S. Pat. No. 3,852,350 or in DE-OS 30 22 952;

(2) by aminolysis of esters (VI) (for example X=CO, Y=$OCH_3$ or o-phenyl) with amines (V), for example using alcoholates in accordance with J. Org. Chem. 28 (1963), pages 2915 or 2917;

(3) by ring-opening acylation of amines (V) with acid anhydrides (VI) (for example X=CO, Y+$R^1$=OCO) in accordance with Ber. Deut. Chem. Ges. 20, 3214, (1887);

(4) by ring closure of the semiamides (I) (for example $R^1$=COOH, X=CO) obtained as in (3) under dehydrating conditions to form the corresponding imides in accordance with L. H. Flett and W. H. Gardner: Maleic Anhydride Derivatives, John Wiley & Sons, 1952, pages 106 et seq., and Houben-Weyl, Methoden der organ. Chem. Vol 11/2, pages 16 et seq., 4th Edition, 1958, (5) by alkylation of amines (V) with alkylating agents (VI) (for example X=Cl or X=

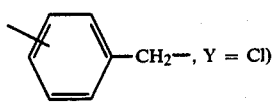

in accordance with DE-SO 30 22 952.

The new antiagers obtainable by these methods may be purified by recrystallization and, optionally, by the addition of absorbents, such as active carbon or active aluminas. In many cases, however, they are used as crude products.

The new antiagers corresponding to general formula (I) may be fixed to polymers in many ways, i.e. during radical polymerization of the monomers mentioned below, preferably by grafting onto preformed polymers, but especially during hardening and vulcanization of the polymers.

These reactions are carried out in known manner in the presence of compounds (I) in mass, emulsion, solution or dispersion, while hardening or vulcanization is carried out under the conventional conditions in the presence of known hardening and vulcanization systems. The antiagers are used in a quantity of from 0.2 to 10%, by weight, preferably from 0.5 to 5%, by weight, based on the polymer.

The antiagers corresponding to general formula (I) according to the present invention may also be reacted in known manner with vinyl monomers to form copolymers having molecular weights of from 1000 to 30,000 and an increased content of from 5 to 70%, by weight, preferably from 10 to 60%, by weight, of (I).

In addition, the antiagers (I) may also be grafted onto polymers having molecular weights of from 1000 to 30,000 (number average), preferably from 2000 to 20,000, so that the polymers contain from 10 to 60%, by weight, preferably from 10 to 50%, by weight, of bound antiager. Such compounds are then added to the high molecular weight polymers and likewise form migration-resistant and substantially non-extractable, effective polymeric antiagers. They are added to the high molecular weight polymers in such quantities that the above-mentioned concentrations of antiager are obtained in the polymer as a whole. To this end, the relatively low molecular weight polymers containing the antiagers in bound form are used in quantities of from 1 to 25%, by weight, preferably from 4 to 20%, by weight, based on the high molecular weight polymers.

Suitable low molecular weight polymers for grafting reactions of the type in question are, for example, polybutadienes, polyisoprenes, copolymers of butadiene and/or isoprene with styrene, acrylonitrile, methyl methacrylate, ethyl acrylate, α-methyl styrene, piperylene, 1,3-hexadiene, ethylene, propylene and vinyl acetate.

Suitable vinyl monomers for producing the copolymers are those mentioned above.

The grafting of the antiagers onto the polymers is carried out under radical conditions, for example in the presence of known radical initiators, such as t-butyl perpivalate, dicumyl peroxide, di-t-butyl peroxide or azodiisobutyronitrile, undiluted or in inert solvents, such as toluene, xylene, petrol, chlorobenzene or dichlorobenzene, at temperatures of from 50° to 200° C., preferably from 70° to 180° C.

The new antiagers are suitable for a wide range of rubbers and plastics, but especially rubbers for example for polymers of 1,3-dienes, such as butadiene, isoprene, piperylene, 2-chlorobutadiene, 2-ethyl-butadiene, and copolymers thereof with vinyl monomers, such as styrene, p-methyl styrene, α-methyl-styrene, norbornene, norbornadiene, acrylic acid, acrylic acid esters and amides, acrylonitrile, ethylene, propylene and vinyl acetate, for polyalkenamers, for example of cyclopentene or 1,5-cyclooctadiene, and for polymers of 1-olefin mixtures, for example of ethylene-propylene or ethylene/propylene/diene containing isolated double bonds. Such polymers may have been formed by radical, coordinative, metathetic or ionic polymerization.

Examples of polymers of the type in question are, for example, BR, natural rubber, SBR, NBR, EPDM and CR, polypentenamer, also polyethylene, polypropylene or polystyrene with small contents of double bonds, and finally single-phase or multiphase polymer mixtures, such as ABS or polystyrene, polyethylene, polypropylene, but especially polymers containing double bonds.

The antiagers are particularly effective in nitrile rubber.

The rubbers may be vulcanized.

A further improvement in breaking elongation may be obtained by the addition of from 5 to 15%, by weight, based on rubber solids, of oligomeric thioethers, for example ether thioethers, such as Vulkanol 85 ®, a product of Bayer AG Leverkusen.

SYNTHESIS OF THE AMINES (V)

EXAMPLE 1

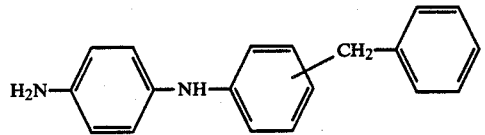

216 g (2 moles) of benzyl alcohol were added dropwise with stirring under nitrogen over a period of 1 hour at 200° C. to a mixture of 184 g (1.0 mole) of 4-aminodiphenylamine and 20 g of acid-activated Fuller's earth. After 3 h at 200° C. followed by dilution with toluene, the reaction mixture is filtered through a pressure filter, the filtrate is concentrated by evaporation and unreacted starting products are distilled under reduced pressure. 280 g of a fraction which, in addition to the benzyl-substituted 4-aminodiphenylamine, contained small quantities of the dibenzyl-substituted compound, finally distilled over at 230°–260° C./0.6–1.0 mbar.

EXAMPLE 2

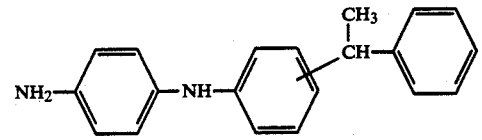

208 g (2.0 moles) of styrene were added dropwise with stirring under nitrogen over a period of 2 h at 200° C. to a mixture of 184 g (1.0 mole) of 4-aminodiphenylamine and 20 g of acid-activated Fuller's earth. After 1 h at 200° C., followed by dilution with toluene, the reaction mixture was filtered through a pressure filter, the filtrate was distilled under reduced pressure and then freed from solvent and unreacted starting products. 286 g of the target compound finally distilled over at 220°–243° C./0.2–0.3 mbar.

EXAMPLE 3

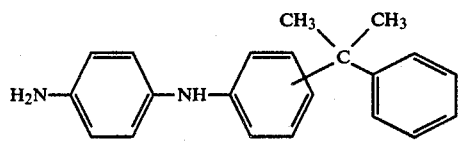

and

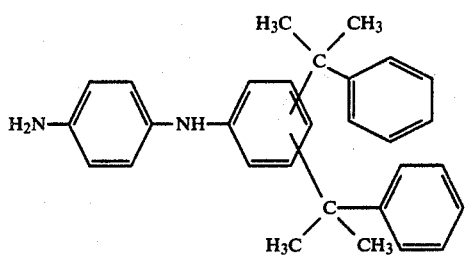

1025 g (8.7 moles) of α-methyl styrene were added dropwise with stirring under nitrogen over a period of 2 h at 200° C. to a mixture of 800 g (4.35 moles) of 4-aminodiphenylamine and 80 g of acid-activated Fuller's earth. After 1 h at 200° C., the reaction mixture diluted with toluene was filtered through a pressure filter and the filtrate distilled under reduced pressure, solvent and unreacted starting products distilling over first, followed at 236°–255° C./0.3 mbar by a fraction I (787 g) which consisted essentially of monoalkylated compounds and then, at 268°–288° C./0.3–0.5 mbar, by a fraction II (530 g) which consisted essentially of the dialkylated compound.

EXAMPLE 4

The procedure was as in Example 3, except that the crude reaction product was not subjected to fractional distillation after the separation of unreacted starting products, but instead was used without further purification.

SYNTHESIS OF THE ANTIAGERS (I)

EXAMPLE 5

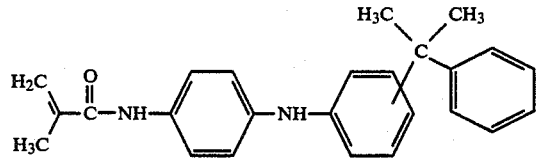

147 g (0.47 mole) of fraction I from Example 3 were dissolved in 500 ml of xylene. 74.4 g of anhydrous sodium carbonate and 1 g of triethylamine were then added, the resulting suspension stirred for approx. 1 h/40° C. and 54 g (0.52 mole) of methacrylic acid chloride which had been dissolved in approx. 50 ml of xylene were added dropwise over a period of from 30 to 40' at 20° C. After 2 h at from 20° to 30° C., the reaction mixture was heated at from 45° to 50° C. for from 2 to 3 h, extracted with water and the organic phase concentrated by evaporation under reduced pressure after drying. The residue comprised 178 g, M.p. 105°–106° C.

(toluene/petroleum ether). The NMR-spectrum agrees with the above structure.

EXAMPLE 6

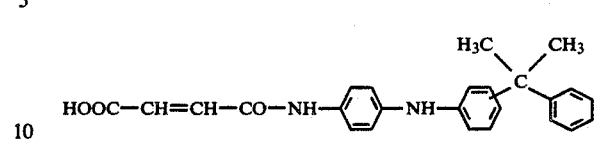

151 g (0.5 mole) of fraction I from Example 3 were dissolved in from 800 to 900 ml of toluene and 49 g (0.5 mole) of maleic acid anhydride dissolved in 200 ml of toluene added dropwise to the resulting solution over a period of 2 h at from 35° to 40° C. The suspension was then stirred for another 2 h at 40° C., filtered under suction, the crystals washed with toluene and petroleum ether and then dried.

Yield: 186 g, M.p.: 179°–181° C. The NMR spectrum agrees with the above structure.

EXAMPLE 7

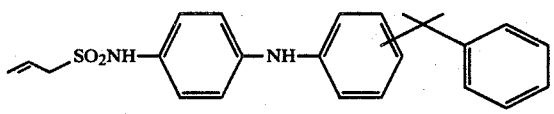

35 g (0.25 mole) of allylsulfonic acid chloride were added to a mixture of 78 g (0.25 mole) of fraction I from Ex. 3, 25 g (0.25 mole) of triethylamine and 200 ml of toluene under nitrogen during two hours at 50° to 60° C. under stirring. After one further hour at 50° to 60° C. the precipitate was filtered off and washed with toluene. The comined filtrates were washed with water, dried and concentrated by evaporation under reduced pressure.

The residue comprised 99 g of viscous brown liquid, which according to the NMR-spectrum corresponds to the above formula.

EXAMPLE 8

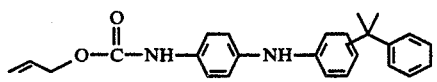

151 g (0.5 mole) of fraction I from Example 3 were dissolved in 300 ml of toluene. 60 g (0.5 mole) of chloroformic acid allyl ester and 22 g (0.55 mole) of sodium hydroxide in 50 ml of water were added during 60 to 70 minutes at 20° to 25° C. under nitrogen and stirring from separate dropping funnels. The mixture was stirred for further 2 to 3 hours at 20° to 25° C. and then diluted with water.

The organic phase was separated, washed with water several times, dried and concentrated by evaporation. The residue comprised 193 g of a dark resin, which according to elemental analysis and the NMR spectrum corresponds to the above formula.

EXAMPLE 9

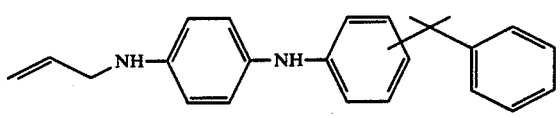

151 g (0.5 mole) of fraction I from Example 3 were mixed with 200 ml of propylene glycol. During 1 to 2 hours 38 g (0.5 mole) of allyl chloride and 20 g (0.5 mole) of sodium hydroxide in 200 ml water were added dropwise and simultaneously from different dropping funnels under stirring and nitrogen at 100° C.

After one further hour of stirring at 100° C. the main amount of the solvent was distilled of under reduced pressure, water and toluene were added and the phases were separated. The organic phase was washed several times with water, dried and concentrated under reduced pressure.

The residue comprised 169 g of a dark resin, which according to the elemental analysis and NMR spectrum agrees with the above structure.

EXAMPLE 10

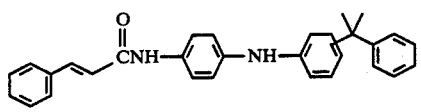

84 g (0.5 mole) of cinnamic acid chloride were reacted instead of chloroformic acid ally ester as in Example 8. After dilution with water the precipitate was filtered off washed several times with water and toluene and dried. 147 g of yellow crystals were obtained with a melting point of 184° to 186° C. The elemental analysis corresponds with the above formula.

COMPARISON EXAMPLE 1

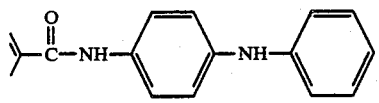

92 g (0.5 mole) of 4-aminodiphenylamine were reacted with methacrylic acid chloride as in Example 5.
Yield 95 g,
M.p. 98°–101° C.

APPLICATION EXAMPLES

EXAMPLE 11

An NBR rubber of 72%, by weight, of butadiene and 28%, by weight, of acrylonitrile was vulcanized using the following formulation in the presence of antiagers according to the present invention and known antiagers:

100.0 parts, by weight, of NBR
1.5 parts, by weight, of mercaptosilane
30.0 parts, by weight, of precipitated silica
0.75 parts, by weight, of stearic acid
3.0 parts, by weight, of zinc oxide
2.5 parts, by weight, of a mixture of fatty acid and fatty acid esters
30.0 parts, by weight, of calcined kaolin
0.25 parts, by weight, of sulphur granulate, 80%
2.5 parts, by weight, of tetramethyl thiuram disulphide
2.0 parts, by weight, of dibenzothiazyl disulphide
4.0 parts, by weight, of mercaptobenzthiazole, zinc salt
10.0 parts, by weight, of a thioether
1.5 parts, by weight, of antiager A-C
A=product of Comparison Example 1
B=product of Example 5
C=distyryl diphenylamine

|  | A | B | C |
|---|---|---|---|
| Mooney scorch 120° C. (mins.) | 16.0 | 15.5 | 16.5 |
| Vulcameter $t_{10}$ (mins.) | 2.4 | 2.4 | 2.4 |
| 170° C. $t_{10}$ (mins.) | 3.6 | 3.4 | 3.5 |
| Vulcanization 20' 170° C., standard bar II | | | |
| Tensile strength (MPa) | 18.8 | 17.5 | 19.4 |
| Breaking elongation % | 580.0 | 565.0 | 595.0 |
| Hardness, RT, Shore A | 60.0 | 59.0 | 59.0 |
| Hot air ageing at 150° C., cellular furnace | | | |
| Residual breaking elongation, %, after 3 days | 90.0 | 100.0 | 97.0 |
| Residual breaking elongation, %, after 5 days | 62.0 | 70.0 | 67.0 |
| Ageing in fuel C, 48 h/40° C., redrying in vacuo 48 h/40° C. | | | |
| Hot air ageing at 135° C., cellular furnace | | | |
| Residual breaking elongation, %, after 7 days | 66.0 | 75.0 | 10.0 |
| Residual breaking elongation, %, after 11 days | 53.0 | 62.0 | 2.0 |

It follows from the measurements that
(1) antiager A, corresponding to U.S. Pat. No. 3,876,334, is less effective than the conventional commercial antiager C against conventional hot-air ageing without extraction and
(2) is less effective than the antiager B against conventional hot-air ageing and against ageing after extraction and
(3) that antiager B is superior to the conventional product C, even against conventional hot-air ageing without extraction.

We claim:
1. Compounds corresponding to the formula

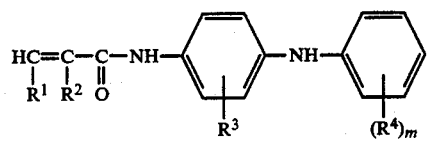

wherein
$R^1$ is hydrogen, methyl or —COOR$^5$;
$R^2$ is hydrogen or methyl;
$R^3$ is hydrogen or methyl;
$R^4$ is aralkyl having 7 to 20 carbon atoms;
$R^5$ is hydrogen or alkyl having 1 to 4 carbon atoms; and
m is 1 or 2.
2. Compounds according to claim 1 wherein $R^4$ is

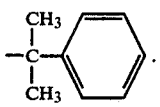

3. Compounds according to claim 1
wherein
R¹ is hydrogen;
R² is methyl;
R³ is hydrogen; and
R⁴ is

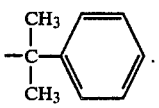

4. Nitrile rubbers and nitrile rubber vulcanizates containing from 0.2 to 10%, by weight, of the compounds according to claim 1.

5. A copolymer having a molecular weight of from 1,000 to 30,000 and derived from a mixture of copolymerized vinyl monomers containing 5 to 70% by weight of a compound of the formula

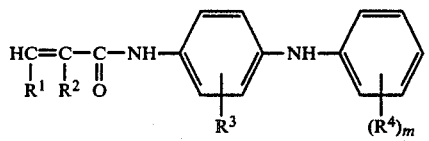

wherein
R¹ is hydrogen, methyl or —COOR⁵;
R² is hydrogen or methyl;
R³ is hydrogen or methyl;
R⁴ is aralkyl having 7 to 20 carbon atoms;
R⁵ is hydrogen or alkyl having 1 to 4 carbon atoms; and
m is 1 or 2.

6. A graft polymer conprising 10 to 60% by weight of antiager compound grafted onto a polymer derived from olefinic monomers and having a molecular weight of 1000 to 30,000 wherein said antiager compound is of the formula

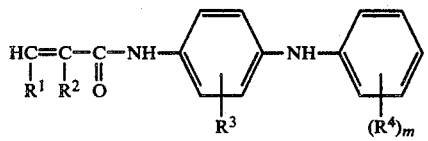

wherein
R¹ is hydrogen, methyl or —COOR⁵;
R² is hydrogen or methyl;
R³ is hydrogen or methyl;
R⁴ is aralkyl having 7 to 20 carbon atoms;
R⁵ is hydrogen or alkyl having 1 to 4 carbon atoms; and
m is 1 or 2.

* * * * *